US006170723B1

(12) United States Patent
Howell

(10) Patent No.: US 6,170,723 B1
(45) Date of Patent: Jan. 9, 2001

(54) DOUBLE OPENING LID FOR A STORAGE BOX FOR A PICK-UP TRUCK BED

(76) Inventor: Brian Dodd Howell, P.O. Box 8837, Myrtle Beach, SC (US) 29578

(*) Notice: Under 35 U.S.C. 154(b), the term of this patent shall be extended for 0 days.

(21) Appl. No.: 09/339,007

(22) Filed: Jun. 23, 1999

(51) Int. Cl.[7] ..................................... B60R 7/00
(52) U.S. Cl. ..................... 224/404; 220/254; 220/256; 220/259; 224/402; 224/539; 296/37.1; 296/37.6
(58) Field of Search ..................... 224/404, 402, 224/539, 543; 296/37.1, 37.5, 37.6; D3/905; 220/254, 256, 259, 817, 819, 818, 826; 312/284, 285, 286, 292; 190/112

(56) References Cited

U.S. PATENT DOCUMENTS

| 532,631 | * | 1/1895 | Barrett ........................ 190/112 |
| 1,118,983 | | 12/1914 | Wheary . |
| 1,180,269 | | 4/1916 | Wheary . |
| 1,282,292 | | 10/1918 | Reuss . |
| 1,418,541 | | 6/1922 | Demlinger . |
| 2,392,948 | | 1/1946 | Reeves . |
| 2,504,879 | | 4/1950 | Reeves . |
| 2,509,665 | | 5/1950 | Apel . |
| 2,585,745 | * | 2/1952 | Crosby ........................ 190/112 |
| 3,008,177 | | 11/1961 | Wooten, Jr. . |
| 3,030,656 | | 4/1962 | Hopkins . |
| 3,344,465 | | 10/1967 | Neumeister . |
| 3,404,486 | | 10/1968 | Kellerhals . |
| 3,434,754 | | 3/1969 | Scaglione . |
| 3,474,569 | | 10/1969 | Grant . |
| 3,690,035 | | 9/1972 | Schindlauer . |
| 4,143,695 | * | 3/1979 | Hoehn ........................ 150/52 |
| 4,288,011 | * | 9/1981 | Grossman ........................ 224/404 |
| 4,342,492 | | 8/1982 | Spevak . |
| 4,412,616 | * | 11/1983 | Williams ........................ 220/524 |
| 4,580,827 | | 4/1986 | Feagan . |
| 4,635,992 | | 1/1987 | Hamilton et al. . |
| 4,770,330 | | 9/1988 | Bonstead et al. . |
| 5,076,641 | | 12/1991 | Lindberg . |
| 5,337,452 | | 8/1994 | LeBlanc et al. . |
| 5,337,911 | * | 8/1994 | Holub ........................ 220/254 |
| 5,419,476 | | 5/1995 | White . |
| 5,439,150 | | 8/1995 | Trahms . |
| 5,464,264 | | 11/1995 | Wilson . |
| 5,657,916 | | 8/1997 | Tackett . |

* cited by examiner

Primary Examiner—Gregory M. Vidovich
Assistant Examiner—Maerena W. Brevard
(74) Attorney, Agent, or Firm—Michael E. Mauney

(57) ABSTRACT

A double opening lid for use in a truck storage box. A first lid opens along a longitudinal dimension of a truck storage box to give full access to the entire interior of the truck storage box. Additionally, two side lids mount along a line perpendicular to the longitudinal dimension of the truck storage box lid open upwardly and inwardly for easy access from the side of the truck in which the truck storage box is mounted. The two side lids will ordinarily be mounted somewhat above the plane of the first lid to provide for run off of rain or other materials. Ordinarily, a frame is employed to provide better rigidity and durability for the lid. Thus, the double opening lid opens longitudinally to give access to the entire truck storage box, and conveniently opens from either side to give easy access from the side of the truck on which the truck storage box equipped with this double opening lid is mounted.

11 Claims, 4 Drawing Sheets

DOUBLE OPENING LID FOR A STORAGE BOX FOR A PICK-UP TRUCK BED

BACKGROUND OF THE INVENTION

1. Field of the Invention

This invention relates to a pick-up truck accessory storage structure and, more particularly, to a new and improved lid to provide easier and greater access to the storage enclosure.

2. Description of Related Art

Pick-up trucks have become an increasingly common mode of transportation, even in urban areas. It has been widely reported that the largest selling single vehicle model in the United States is the Ford "F" Series truck. A common accessory for pick-up trucks is a storage box. This storage box is mounted on the walls that enclose the bed of the pick-up truck. It extends across the width of the bed of the pick-up truck. Ordinarily, these boxes do not extend all the way to the floor of the bed of the pick-up truck, but terminate a few inches above the floor of the bed of the pick-up truck. This allows long flat items like 2×4's to use the full length of the pick-up truck bed for carrying or storage. Most commonly, tools or other valuable items are carried within this storage box and the storage box has a lock on its lid.

These truck storage boxes are commonly constructed of some metal or plastic material. The metal boxes are more durable and rigid and are seen in commercial applications. High-impact plastic boxes are often sold for the mass market in such stores as Wal-Mart, Advance Auto Parts, or the like, and are more commonly used by individuals than in commercial applications. The plastic storage boxes have the advantage of lighter construction. Therefore, the lid on the plastic boxes will oftentimes be hinged on a lengthwise axis of the truck storage box that is closest to the truck cab. Therefore, the lid will open across the entire lengthwise dimension of the truck storage box. This lid makes it easier to store lengthy and bulky items in the box. Essentially, if an item will fit within the box, it will fit within the opening created by a lengthwise lid.

Metal storage boxes frequently have a different lid construction. A metal lid opening entirely along the lengthwise dimension of the pick-up truck storage box may be too heavy to be easily opened by someone standing on the outside of the truck bed. The usual lid opening arrangement for metal boxes are to have two lids that hinge in the middle on a line bisecting the lengthwise dimension of the storage box. If both of these lids are opened at once, they swing open in a wing-like manner and rest against each other on a line that approximately bisects the length of the storage box and extends across the width of the storage box. A user standing outside of the truck bed to the side near either door of the truck can lift and open one of the lids and remove or place items within the truck storage box. However, large or bulky items can be difficult to place within the box because the lengthwise dimension of the box is necessarily bisected by a fixed piece on which the lids are hinged. Thus, only one-half of the top of the box is exposed by opening either of the lids. This restricts the size and shape of what can be placed through the lid opening into the box.

A variety of devices have been devised to improve the standard pick-up truck storage box. For example, in the Bonstead et al U.S. Pat. No. 4,770,330 a multi-piece box is disclosed that is designed for adjustable size and easily disassembly. A three-piece box with a removable middle piece is disclosed. This device adjusts from wide to narrow pick-up truck beds by removing or replacing the middle piece.

Trahms U.S. Pat. No. 5,439,150 discloses a truck storage box having a center compartment with an accessory lid accessible through the rear window of an associated pick-up truck. This provides access to a part of the storage box from the truck cab, access not available with conventional designs.

Other devices disclose other accessories or modifications of the pick-up truck bed to improve or change the storage capacity. For example, the Wilson U.S. Pat. No. 5,464,264 discloses an improved cargo bed with moveable panels to convert the cargo bed from a fully opened to a partially enclosed bed. The partial enclosure is secure and weather resistent. The Tackett U.S. Pat. No. 5,657,916 discloses a molded shell fitting within the entire pick-up truck bed. It is less than the full height of the side walls. This permits large flat objects to be placed on the top of the enclosure. This invention has two doors—one that opens the entire enclosure and one that opens the rear one-third.

Other patents deal with different types of openings that hinge in more than one direction. For example, the Lindberg U.S. Pat. No. 5,076,641 discloses an arm rest that opens along the width and along the length of the arm rest. The Hopkins U.S. Pat. No. 3,030,656 discloses an oven that hinges both on the side of the oven and hinges in a conventional fashion at the bottom of the oven opening to open along a lengthwise dimension of the oven opening. The Spevak U.S. Pat. No. 4,342,492 discloses an article supporting container with a pivotally mounting lid that serves to hold and display items as well as to close and latch the container.

Despite all of this prior work, conventional truck storage box lids have significant disadvantages. If a truck storage box is equipped with the gull wing lids that hinge and opens in the middle of the box, then these lids are easily opened and accessible from the outside of the truck bed near both the left and right hand doors of the pick-up truck cab. However, very bulky or lengthy items are difficult to place within the truck storage box because of the restricted size of the opening. If a truck storage box is equipped with a lid that hinges on the lengthwise dimension of the box in proximity to the truck cab, then the entire lid may be opened along the lengthwise dimension exposing the entire top of the truck storage box. However, for a metal truck storage box it will be difficult or even impossible for a small person to open this lid unless standing in the truck bed. The lids are too heavy to be easily opened by a person standing outside of the truck bed near the left or right hand door of the truck cab. Moreover, the weight of the lid places great stress on the box lid unless it has an underlying frame or support which, again, adds to the weight of the entire truck lid.

SUMMARY OF THE INVENTION

In view of the foregoing disadvantages inherently in the known types of lids for truck storage boxes, the present invention provides a storage box lid that will open in both the conventional gull wing fashion along a widthwise dimension of the storage box and will also open along the lengthwise dimension of the box on hinges in proximity to the cab of the truck. Thus, one may stand outside of the truck near the left or right hand door and open one of the gull wing widthwise hinged lids to access approximately half of the interior of the truck storage box, or one may open the lengthwise lid by standing in the truck bed and opening iL It could be opened by one person on the side of the truck, although the lid will be large enough and heavy enough to make this difficult for most people.

The advantage the current invention provides is ready access from the outside of the truck to one-half of the truck storage box or ready access from inside the truck bed to the entire truck storage box combining the advantages and features of both of the conventional lid designs but with none of their disadvantages.

DETAILED DESCRIPTION OF THE DRAWINGS

Figure 1A:
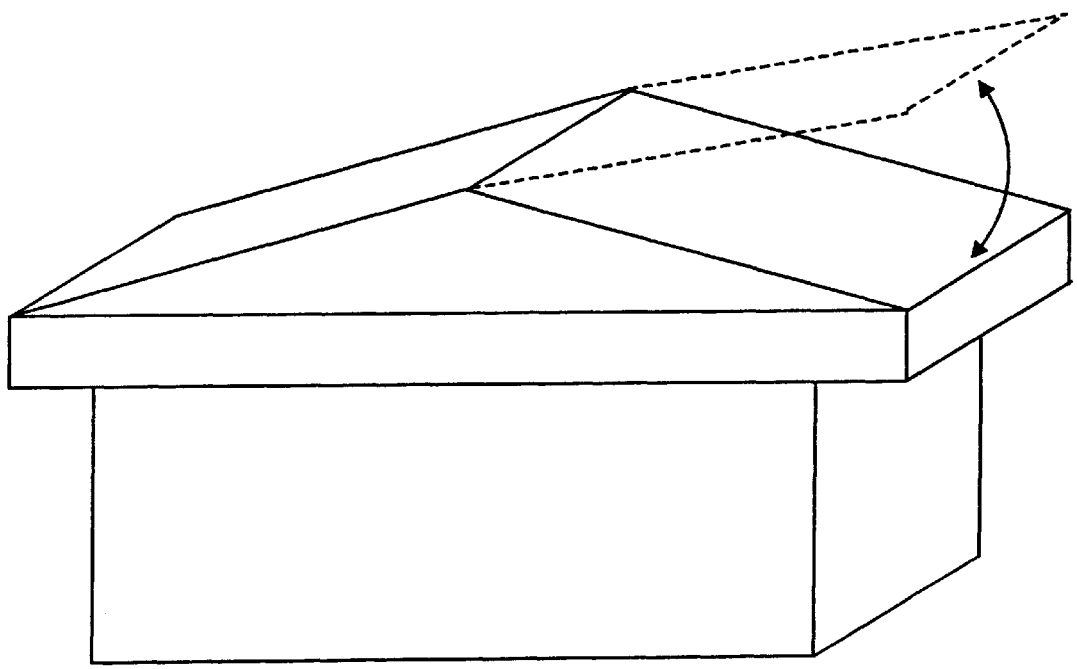
FIGS. 1A and 1B show prior art lids for pick-up truck storage boxes.

FIG. 1A shows one type of a conventional prior art truck storage box. This box is constructed of metal with a gull wing-type lid that opens along a widthwise hinge. One lid is shown opened in dotted lines and one lid is shown closed. Access to the storage box is limited with this type of lid.

Figure 1B:
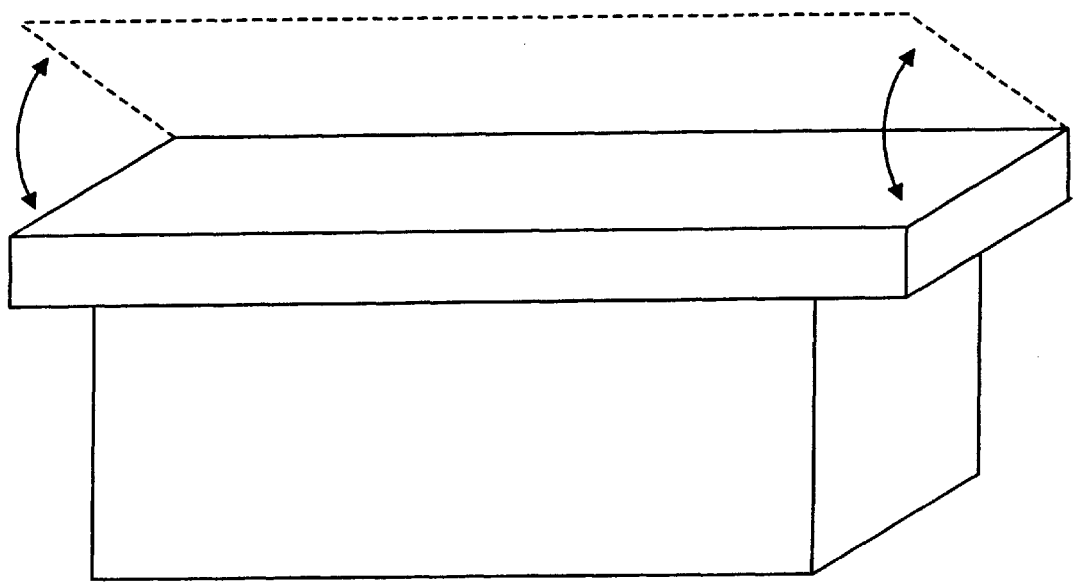

FIG. 1B shows a second type of conventional prior art truck storage box where the hinges are placed on a lengthwise dimension of the box in proximity to the truck cab. Here the lid is shown partially opened in dotted lines. With this lid the entire lengthwise dimension of the box is accessible through the top opening of the box when the lid is fully opened. However, when the box is constructed of metal, the lid is very heavy and hard to open from the sides of the truck.

Figure 2:
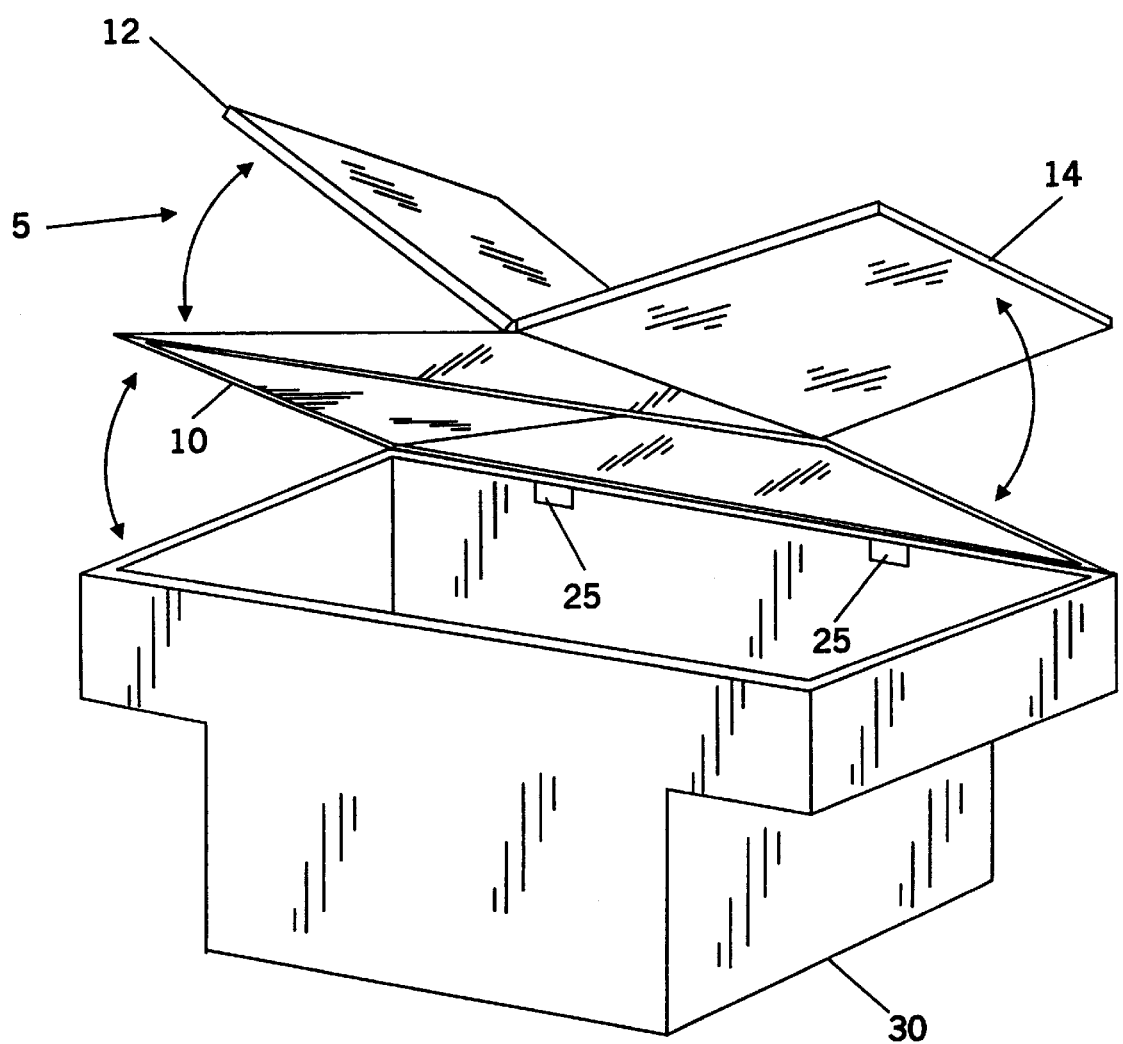
FIG. 2 is a prospective view of the current invention with both lids partially opened.

FIG. 2 shows the double opening lid (5) invention partially opened. The basic support for the lid is a rectangular metal frame (10) (seen more clearly in FIG. 3). This is the same size and shape as the open side of the storage box (30) on which it is mounted. The frame (10) is attached to the storage box (30) by two hinges (25) along a longitudinal dimension of both the frame (10) and the storage box (30). Ordinarily, this dimension of the storage box (30) will be placed in proximity to the truck cab. Therefore, the frame (10) and the double opening lid (5) will open upward from the truck bed in which the storage box (30) is mounted toward the truck cab. The double opening lid (5) seen from above has a rectangular shape. The first side lid (12) and the second side lid (14) are hinged near a line toward a center line intersecting the longitudinal dimension of the framework (10), but somewhat above it. This allows the first side lid (12) and the second side lid (14) to be opened from sides of the truck storage box (30). Side lids (12) and (14) give easy access to the interior of the storage box (30) from either side of the truck in which the storage box (30) is mounted.

Figure 3:
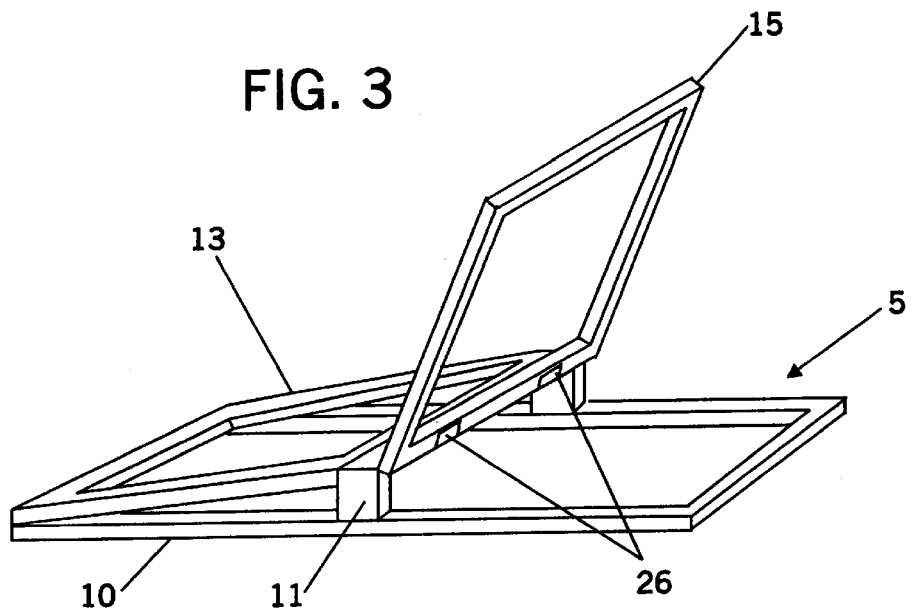
FIG. 3 shows a framework of one embodiment of the current invention.

FIG. 3 shows the framework of the double opening lid without any covering or sheeting material. If the sheeting material is suitably rigid, a framework is not necessary. However, it is believed by adding a framework of rectangular bars the sheeting material could be made of lighter material reducing the overall weight of the double opening lid (5) and adding to its utility. The framework consists of a frame (10) seen as a rectangular open structure. Attached along the longitudinal side of the frame (10) is a C-shaped bar (11) approximately at the midpoint of the two longitudinal sides. If one wishes to have the two side lids (12, 14) (not shown in FIG. 3) symmetrical in shape and size, then the C-shaped bar (11) will be attached at the midpoint of the two longitudinal sides of the frame (10). The two side lids (12, 14) could be made of metal or any other rigid durable material. They could be attached directly to the C-shaped bar (11). However, FIG. 3 shows underlying rectangular side lid bar frames (13 and 15) for the two side lids (12 and 14). The first side lid bar frame (13) is shown in the closed position resting against the frame (10). The second side lid bar frame (15) for the second side lid (14) is shown in an open position. Both the first side lid bar frame (13) and the second side lid bar frame (15) will be attached to the C-shaped bar (11) by hinges (26) along the C-shaped bar (11). Apart from providing overall rigidity to the double opening lid (5), the C-shaped bar (11) elevates the side lids (12, 14) so that a slight slope or roof like effect will be achieved to allow water to run off, rather than pooling or possibly to leak in to the truck storage box (30) (not seen in this view). Once the first side lid bar frame (13) and the second side lid bar frame (15) are assembled and attached to the C-shaped bar (11) by hinges(26), it will be easily appreciated that any rigid waterproof sheeting material could be attached to the frame (10), the C-shaped bar (11), the first side lid frame (13), and the second side lid frame (15) to complete the entire double opening lid (5).

It will be appreciated by one of skill in the art that a variety of different construction techniques could be chosen in the manner of construction of the double opening lid invention (5). The entire lid could be simply constructed of rigid metal material without the underlying frame. A portion of the lid could be metal while another portion could be plastic or other suitable high-impact material. Variations in precise construction techniques do not affect the underlying utility of the invention, which is to provide a lid that opens along a longitudinal dimension and provides access to the entire truck storage box, while also providing two side lids that operate independently.

Figure 4:
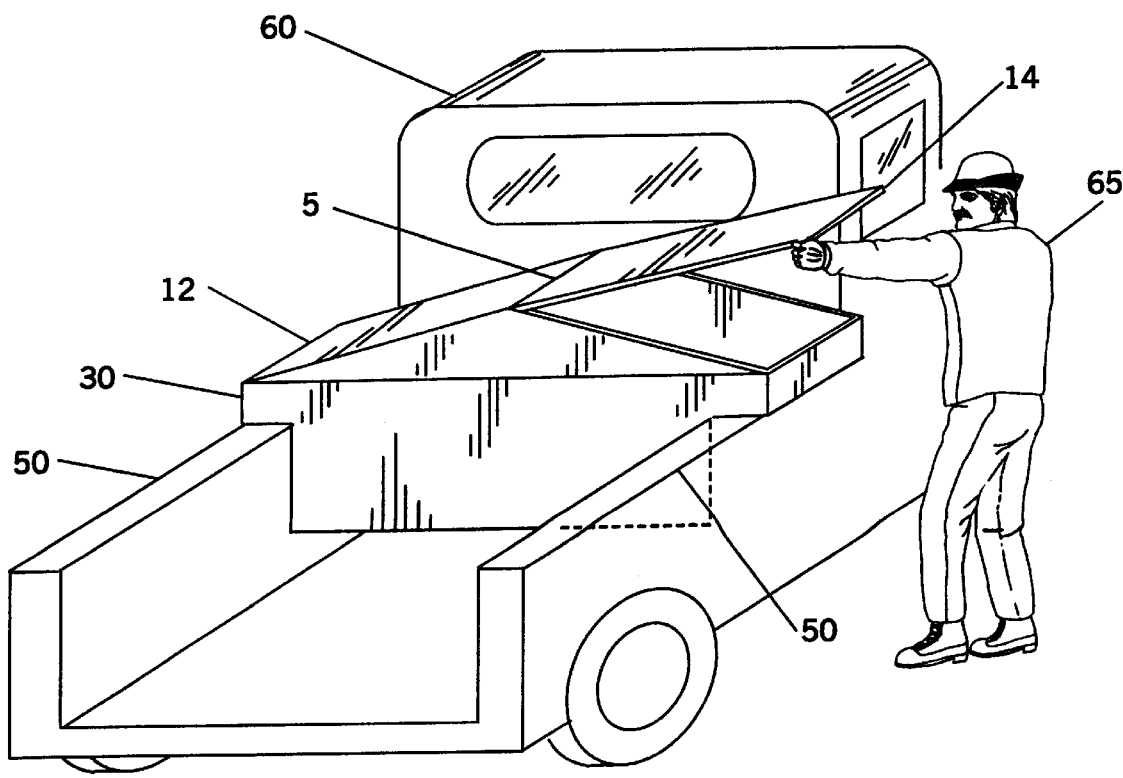
FIG. 4 shows the lid of the current invention opening from the side of a truck.
Figure 5:
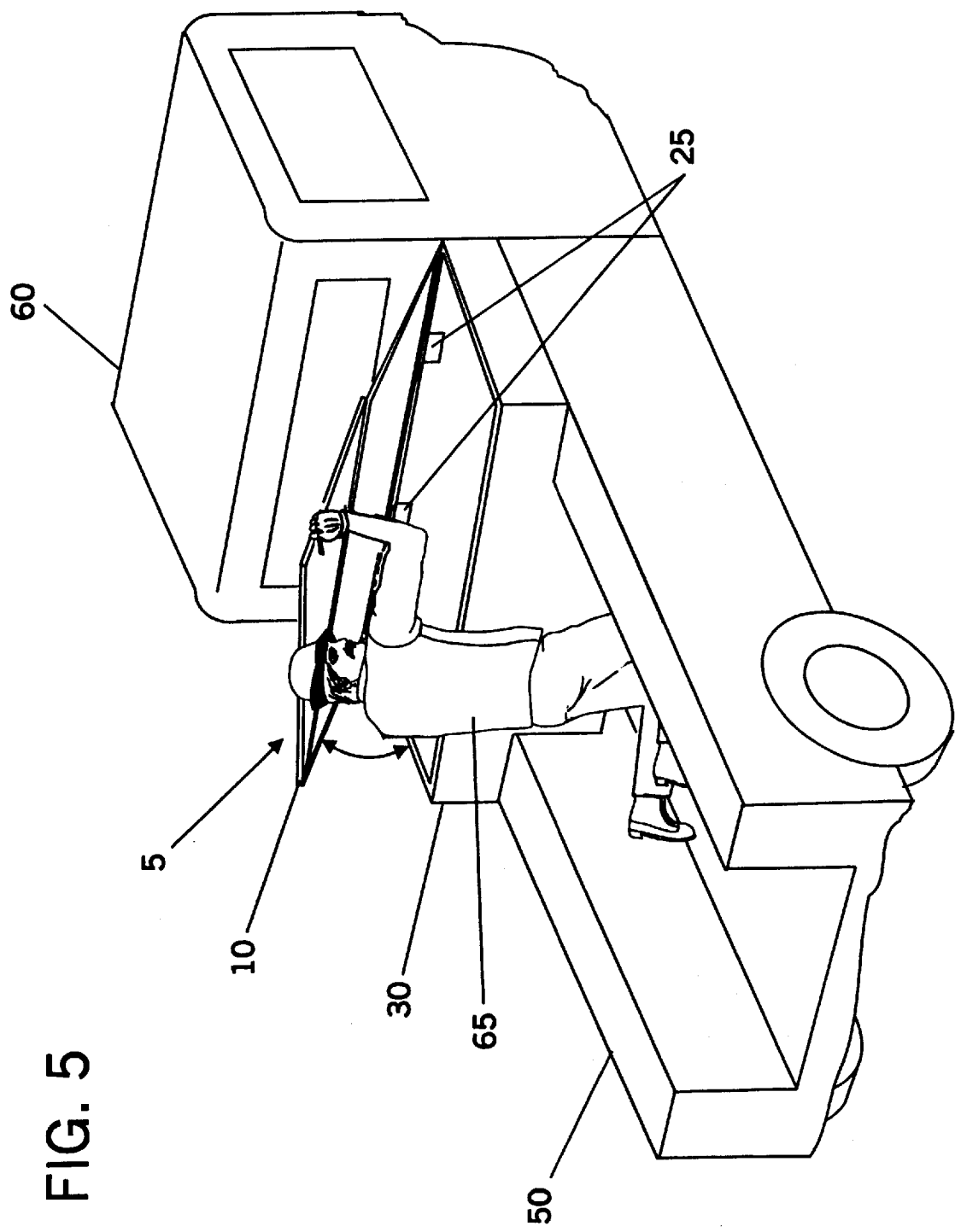
FIG. 5 shows the lid of the current invention opening along its length from the truck bed.

FIGS. 4 and 5 show the current invention positioned inside a pick-up truck bed. The storage box (30) is shown attached to the sidewalls (50) of a pick-up truck (60). In FIG. 4, an operator (65) is standing outside the truck and is opening the second side lid (14). The first side lid (12) of the double opening lid (5) remains closed. Here, the operator (65) will have easy access from outside of the truck by either the second side lid (14), shown open in FIG. 4, or the first side lid (12), shown closed in FIG. 4. Both side lids (12 and 14) will be relatively light and easy to open from the outside by the operator (65), as is shown in FIG. 4.

In FIG. 5 the truck storage box (30) is again shown positioned against the sidewalls (50) of the truck (60). Here, the operator (65) is inside the truck bed and is opening the double opening lid (5) by means of the hinges (25) fixed along a longitudinal dimension of the frame (10) and of the storage box (30). Because the operator (65) is inside the truck bed, he will have an easier time lifting the larger heavier double lid (5) from an inside position than from a position outside the truck, as was shown in FIG. 4.

This invention allows quick access to the truck storage box (30) from outside of the truck by means of the side lids (12, 14) and a fuller access to the entire truck storage box (30) by means of the longitudinal hinges (25) that open the entire double opening lid (5) along its longitudinal dimension. Small light items will be loaded and unloaded from the truck storage box (30) by means of the side lids (12, 14), while larger or heavier items will be loaded by means of the longitudinal opening using the hinges (25) and the frame (10). Variation in construction, materials, and techniques are permitted without departing from the inventive concept herein. The specific embodiments described above are not by way of limitation, but rather of example. The only limitations are contained in the claims, which follow hereafter.

I claim:

1. A double opening lid for use in a storage box in a pick-up truck bed comprising:

(a) a hatch cover hingably attached substantially along a longitudinal dimension of a truck storage box to said truck storage box wherein said hatch cover covers the top of a truck storage box and hingably opens along a longitudinal dimension of a truck storage box;

(b) a first side lid hingably attached to said hatch cover along a first widthwise dimension in proximity to a line bisecting the longitudinal dimension of said hatch cover whereby said first lid hinges upwardly from said first widthwise dimension of said hatch cover;

(c) a second side lid hingably attached to said hatch cover along a second widthwise dimension in proximity to said line bisecting the longitudinal dimension of said hatch cover, said first widthwise dimension and said second widthwise dimension are parallel to each other whereby said second side lid hinges upwardly from said second widthwise dimension of said hatch cover;

(d) a means for elevating said first side lid's hingable attachment and said second side lid's hingable attachment above a plane defined by said hatch cover whereby water falling on said double opening lid will run off.

2. A double opening lid for use in a storage box in a pick-up truck bed of claim 1 wherein said means for elevating is a C-shaped piece attached to said hatch cover.

3. A double opening lid for use in a storage box in a pick-up truck bed of claim 2 wherein said first side lid and said second side lid are hingably attached to said C-shaped piece.

4. A truck storage box with a double opening lid for use in a pick-up truck bed comprising:

(a) a storage box with a bottom and four upstanding sides attached to said bottom;

(b) a hatch cover hingably substantially attached along a longitudinal dimension of said truck storage box, said hingable attachment above and opposite of said bottom of said truck storage box;

(c) a first side lid hingably attached along a first widthwise dimension of said hatch cover;

(d) a second side lid hingably attached a second widthwise dimension of said hatch cover, said first widthwise dimension and said second widthwise dimension parallel to each other and in proximity to a line bisecting longitudinal dimension of said hatch cover;

(e) a means for elevating said first side lid's and said second side lid's hingable attachment;

whereby said hatch cover, said first side lid, and said second side lid provide access to the inside of said truck storage box.

5. A truck storage box with a double opening lid of claim 4 wherein said line bisecting the longitudinal dimension of said hatch cover is at a mid-point of said longitudinal dimension of said hatch cover.

6. A truck storage box with a double opening lid of claim 5 wherein said means for elevating is a C-shaped piece.

7. A double opening lid for use in a storage box in a pick-up truck bed comprising:

(a) a frame;

(b) a hatch cover attached to said frame, said frame hingably attached substantially along a longitudinal dimension of a truck storage box wherein said hatch cover covers the top of a truck storage box and hingably opens along a longitudinal dimension of a truck storage box;

(c) a first side lid hingably attached to said hatch cover along a first widthwise dimension of said hatch cover whereby said first lid hinges upwardly from said first widthwise dimension of said hatch cover;

(d) a second side lid hingably attached to said hatch cover along a second widthwise dimension of a said hatch cover whereby said second side lid hinges upwardly from said second widthwise dimension of said hatch cover; (e) a C-shaped piece attached to said frame which elevates said hatch cover whereby said first side lid's hingable attachment and said second side lid's hingable attachment is above a plane defined by said frame whereby water falling on said double opening lid will run off.

8. A double opening lid for use in a storage box in a pick-up truck bed of claim 7 wherein said first widthwise dimension and said second widthwise dimension are parallel to each other.

9. A double opening lid for use in a storage box in a pick-up truck bed of claim 8 wherein said first widthwise dimension and said second widthwise dimension are in proximity to a line bisecting longitudinal dimension of said hatch cover.

10. A double opening lid for use in a storage box in a pick-up truck bed of claim 9 wherein said first side lid includes a first lid frame hingably attached to said C-shaped piece.

11. A double opening lid for use in a storage box in a pick-up truck bed of claim 10 wherein said second side lid includes a second lid frame hingably attached to said C-shaped piece.

* * * * *